United States Patent
Wheeler et al.

(10) Patent No.: US 10,240,607 B2
(45) Date of Patent: Mar. 26, 2019

(54) BLOWER ASSEMBLY FOR A VEHICLE SEAT

(71) Applicant: Kongsberg Automotive, Inc., Novi, MI (US)

(72) Inventors: Douglas Wheeler, Novi, MI (US); Daniel Josefson, Falkoping (SE); Frank Dankbaar, Mullsjö (SE)

(73) Assignee: Kongsberg Automotive, Inc., Novi, MI (US)

( * ) Notice: Subject to any disclaimer, the term of this patent is extended or adjusted under 35 U.S.C. 154(b) by 0 days.

(21) Appl. No.: 15/443,483

(22) Filed: Feb. 27, 2017

(65) Prior Publication Data

US 2017/0248146 A1   Aug. 31, 2017

Related U.S. Application Data

(60) Provisional application No. 62/300,322, filed on Feb. 26, 2016.

(51) Int. Cl.
*B60N 2/56* (2006.01)
*H02K 3/00* (2006.01)
(Continued)

(52) U.S. Cl.
CPC ........... *F04D 25/08* (2013.01); *B60N 2/5621* (2013.01); *F04D 25/06* (2013.01); *F04D 29/281* (2013.01);
(Continued)

(58) Field of Classification Search
CPC .. H02K 21/24; H02K 21/182793; H02K 3/47; H02K 7/14; B60N 2/56
See application file for complete search history.

(56) References Cited

U.S. PATENT DOCUMENTS

| | | | |
|---|---|---|---|
| 4,638,196 A | * | 1/1987 | Kranzler ............... H02K 5/148 310/50 |
| 6,398,526 B1 | | 6/2002 | Yang |

(Continued)

FOREIGN PATENT DOCUMENTS

| | | |
|---|---|---|
| CN | 201255128 Y | 6/2009 |
| CN | 201255130 Y | 6/2009 |

(Continued)

OTHER PUBLICATIONS

English language abstract and computer-generated translation of CN101324240B extracted from espacenet.com database Aug. 14, 2017, 8 pages.

(Continued)

*Primary Examiner* — Shin H Kim
(74) *Attorney, Agent, or Firm* — Howard & Howard Attorneys PLLC

(57) ABSTRACT

A vehicle seat comprises a seat bottom having a bottom cushion and a seat back coupled to the seat bottom with the seat back having a back cushion. At least one of the bottom cushion and the back cushion defines a passage. The vehicle seat further comprises a blower assembly coupled to one of the seat bottom and the seat back. The blower assembly comprises a housing and a stator, which is coupled to the housing and comprises a plurality of driving coils. The blower assembly further comprises a rotor rotatably coupled to the housing about a rotational axis, with the rotor comprising a plurality of permanent magnets arranged to generate a flux concentrated on the driving coils. The blower assembly further comprises an impeller coupled to the rotor to rotate about the rotational axis to generate a flow of air through the passage.

23 Claims, 16 Drawing Sheets

(51) Int. Cl.
   *F04D 25/08* (2006.01)
   *F04D 25/06* (2006.01)
   *F04D 29/28* (2006.01)
   *F04D 29/42* (2006.01)
   *F04D 29/62* (2006.01)
   *H02K 1/18* (2006.01)
   *H02K 1/27* (2006.01)
   *H02K 5/20* (2006.01)
   *H02K 7/14* (2006.01)
   *H02K 9/16* (2006.01)
   *H02K 9/18* (2006.01)

(52) U.S. Cl.
   CPC ....... *F04D 29/4206* (2013.01); *F04D 29/624* (2013.01); *H02K 1/182* (2013.01); *H02K 1/2793* (2013.01); *H02K 5/20* (2013.01); *H02K 7/14* (2013.01); *H02K 9/16* (2013.01); *H02K 9/18* (2013.01); *H02K 2213/03* (2013.01)

(56) References Cited

U.S. PATENT DOCUMENTS

| | | | |
|---|---|---|---|
| 6,641,378 B2 * | 11/2003 | Davis | F04D 13/0666 310/90.5 |
| 6,776,590 B2 | 8/2004 | Cooper et al. | |
| 6,846,168 B2 * | 1/2005 | Davis | F04D 13/0666 310/90.5 |
| 7,109,625 B1 | 9/2006 | Jore et al. | |
| 7,232,292 B2 | 6/2007 | Lopatinsky et al. | |
| 7,237,599 B2 | 7/2007 | Lopatinsky et al. | |
| 7,375,449 B2 | 5/2008 | Butterfield | |
| 7,455,501 B2 | 11/2008 | Horng et al. | |
| 7,456,541 B2 | 11/2008 | Horng et al. | |
| 7,598,643 B2 * | 10/2009 | Davis | F04D 13/0666 310/67 R |
| 7,598,646 B2 | 10/2009 | Cleveland | |
| 7,619,337 B2 | 11/2009 | Kasai et al. | |
| 7,679,260 B2 | 3/2010 | Yamamoto et al. | |
| 7,737,594 B2 | 6/2010 | Abe et al. | |
| 7,753,440 B2 | 7/2010 | Zeyen et al. | |
| 7,862,309 B2 | 1/2011 | Chen et al. | |
| 7,884,523 B2 | 2/2011 | Horng et al. | |
| 7,919,897 B2 | 4/2011 | Tajima et al. | |
| 7,977,843 B2 | 7/2011 | Atarashi et al. | |
| 8,035,266 B2 | 10/2011 | Atarashi et al. | |
| 8,044,547 B2 | 10/2011 | Yamashita et al. | |
| 8,177,530 B2 | 5/2012 | Horng et al. | |
| 8,278,794 B2 | 10/2012 | Ishikawa et al. | |
| 8,283,829 B2 | 10/2012 | Yamamoto et al. | |
| 8,297,950 B2 | 10/2012 | Horng | |
| 8,304,949 B2 | 11/2012 | Yamamoto | |
| 8,395,292 B2 | 3/2013 | Amari et al. | |
| 8,419,385 B2 | 4/2013 | Horng | |
| 8,476,800 B2 | 7/2013 | Lai et al. | |
| 8,553,136 B2 | 10/2013 | Toyama et al. | |
| 8,608,463 B2 | 12/2013 | Huang et al. | |
| 8,662,579 B2 * | 3/2014 | Yoshizawa | B60N 2/5657 297/180.13 |
| 8,696,332 B2 | 4/2014 | Horng | |
| 8,760,030 B2 | 6/2014 | Ross et al. | |
| 8,823,241 B2 | 9/2014 | Jore et al. | |
| 9,004,993 B2 * | 4/2015 | Fujii | B60H 1/00285 297/180.13 |
| 9,214,840 B2 | 12/2015 | Kojima et al. | |
| 9,551,348 B2 | 1/2017 | Lin et al. | |
| 9,790,961 B2 * | 10/2017 | Wu | F04D 29/665 |
| 2003/0091450 A1 * | 5/2003 | Davis | F04D 13/0666 417/423.7 |
| 2004/0141861 A1 * | 7/2004 | Davis | F04D 13/0666 417/423.7 |
| 2004/0195870 A1 | 10/2004 | Bohlender et al. | |
| 2005/0031447 A1 * | 2/2005 | Fedoseyev | F04D 25/066 415/176 |
| 2005/0053498 A1 | 3/2005 | Hu | |
| 2005/0147501 A1 * | 7/2005 | Cheng | F04D 25/0606 417/53 |
| 2007/0053781 A1 * | 3/2007 | Davis | F04D 13/0666 417/423.1 |
| 2007/0114868 A1 | 5/2007 | Horng et al. | |
| 2007/0222331 A1 | 9/2007 | Horng et al. | |
| 2008/0157634 A1 * | 7/2008 | Sekiguchi | H02K 1/182 310/67 R |
| 2010/0314974 A1 | 12/2010 | Horng et al. | |
| 2011/0116928 A1 * | 5/2011 | Czulak | F04D 25/082 416/95 |
| 2011/0150674 A1 | 6/2011 | Furlan | |
| 2012/0169154 A1 | 7/2012 | Curodeau | |
| 2012/0261974 A1 * | 10/2012 | Yoshizawa | B60N 2/5642 297/452.42 |
| 2013/0002066 A1 | 1/2013 | Long | |
| 2013/0147291 A1 * | 6/2013 | Woolmer | H02K 1/14 310/58 |
| 2013/0189130 A1 | 7/2013 | Chang et al. | |
| 2013/0270945 A1 * | 10/2013 | Ziegler | H02K 21/24 310/90 |
| 2014/0030122 A1 | 1/2014 | Ozaki et al. | |
| 2014/0265653 A1 * | 9/2014 | Heins | H02K 21/24 310/51 |
| 2014/0301221 A1 | 10/2014 | Nadeau et al. | |
| 2015/0093271 A1 | 4/2015 | Hiromoto | |
| 2015/0118081 A1 | 4/2015 | Tsai et al. | |
| 2016/0001686 A1 * | 1/2016 | Jung | B60N 2/5635 297/180.14 |
| 2016/0341202 A1 | 11/2016 | Chai et al. | |
| 2017/0074286 A1 * | 3/2017 | Kreidler | F04D 29/5813 |
| 2017/0187256 A1 * | 6/2017 | Zhang | B60K 17/12 |
| 2017/0248146 A1 * | 8/2017 | Wheeler | H02K 9/16 |

FOREIGN PATENT DOCUMENTS

| | | |
|---|---|---|
| CN | 101324240 B | 6/2011 |
| CN | 205243942 U | 5/2016 |
| DE | 202014104528 U1 | 10/2014 |
| EP | 2295814 A1 | 3/2011 |
| EP | 2315945 A1 | 5/2011 |
| JP | 2009019573 B2 | 11/2010 |
| KR | 20160030149 A | 3/2016 |
| WO | WO2009156423 A1 | 12/2009 |
| WO | WO2011055124 A1 | 5/2011 |

OTHER PUBLICATIONS

English language abstract and computer-generated translation of CN201255128Y extracted from espacenet.com database Aug. 14, 2017, 6 pages.

English language abstract and computer-generated translation of CN201255130Y extracted from espacenet.com database Aug. 14, 2017, 6 pages.

English language abstract and computer-generated translation of CN205243942U extracted from espacenet.com database Aug. 14, 2017, 5 pages.

Computer generated English language translation of DE202014104528U1 extracted from espacenet.com database Aug. 14, 2017, 8 pages.

English language abstract and computer-generated translation of JP4572219B2 extracted from espacenet.com database Aug. 14, 2017, 7 pages.

English language abstract and computer-generated translation of KR20160030149A extracted from espacenet.com database Aug. 14, 2017, 8 pages.

* cited by examiner

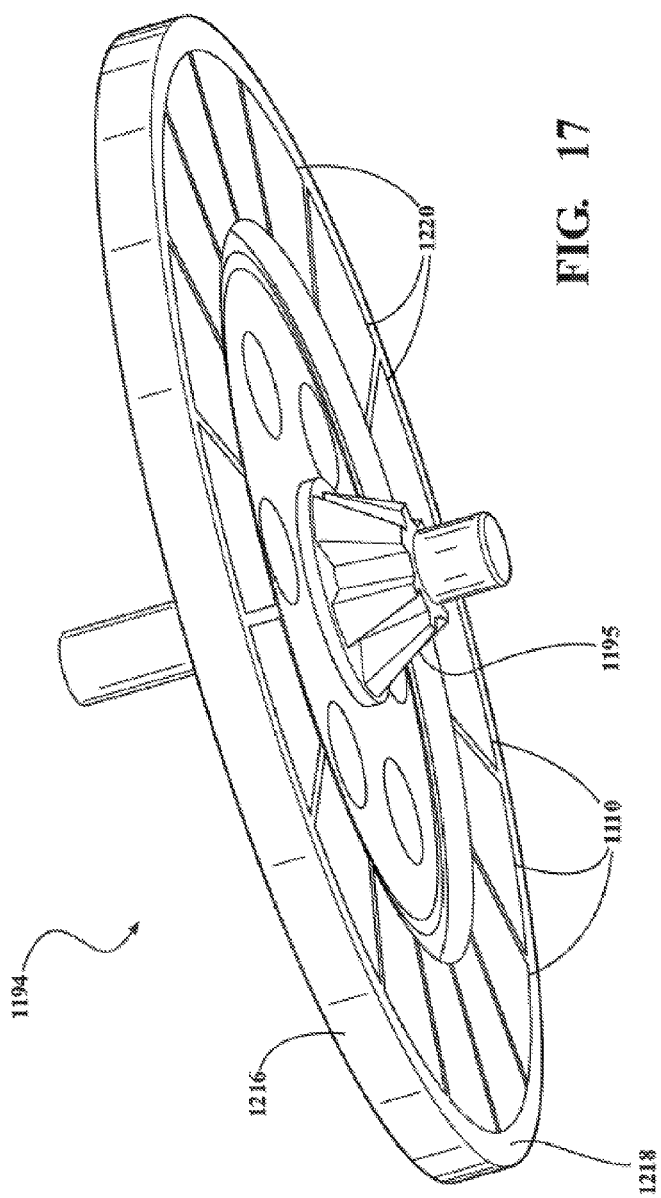

BLOWER ASSEMBLY FOR A VEHICLE SEAT

RELATED APPLICATION

This application claims the benefit of U.S. Provisional Patent Application No. 62/300,322, filed on Feb. 26, 2016, the entirety of which is incorporated by reference.

TECHNICAL FIELD

The subject invention relates generally to a vehicle seat comprising a blower assembly for use in seat ventilation with the blower assembly having a plurality of magnets arranged to concentrate flux to provide clearance for various impeller configurations and reduce the overall size of the blower assembly.

SUMMARY OF THE DISCLOSURE

One example of the present invention provides a vehicle seat comprising a seat bottom having a bottom cushion and a seat back, which is coupled to the seat bottom and includes a back cushion. At least one of the bottom cushion and the back cushion defines a passage. The vehicle seat further comprises a blower assembly coupled to one of the seat bottom and the seat back. The blower assembly comprises a housing and a stator, which is coupled to the housing and comprises a plurality of driving coils. The blower assembly further comprises a rotor rotatably coupled to the housing about a rotational axis, with the rotor comprising a plurality of permanent magnets arranged to generate a flux concentrated on the driving coils. The blower assembly further comprises an impeller coupled to the rotor to rotate about the rotational axis to generate a flow of air through the passage.

BRIEF DESCRIPTION OF THE DRAWINGS

Advantages of the present invention will be readily appreciated as the same becomes better understood by reference to the following detailed description when considered in connection with the accompanying drawings.

FIG. 17 is a bottom perspective view of the rotor of FIG. 15, illustrating the rotor having a first side and a second side facing the stator and having permanent magnets mounted to the second side.

DETAILED DESCRIPTION

Figure 1:
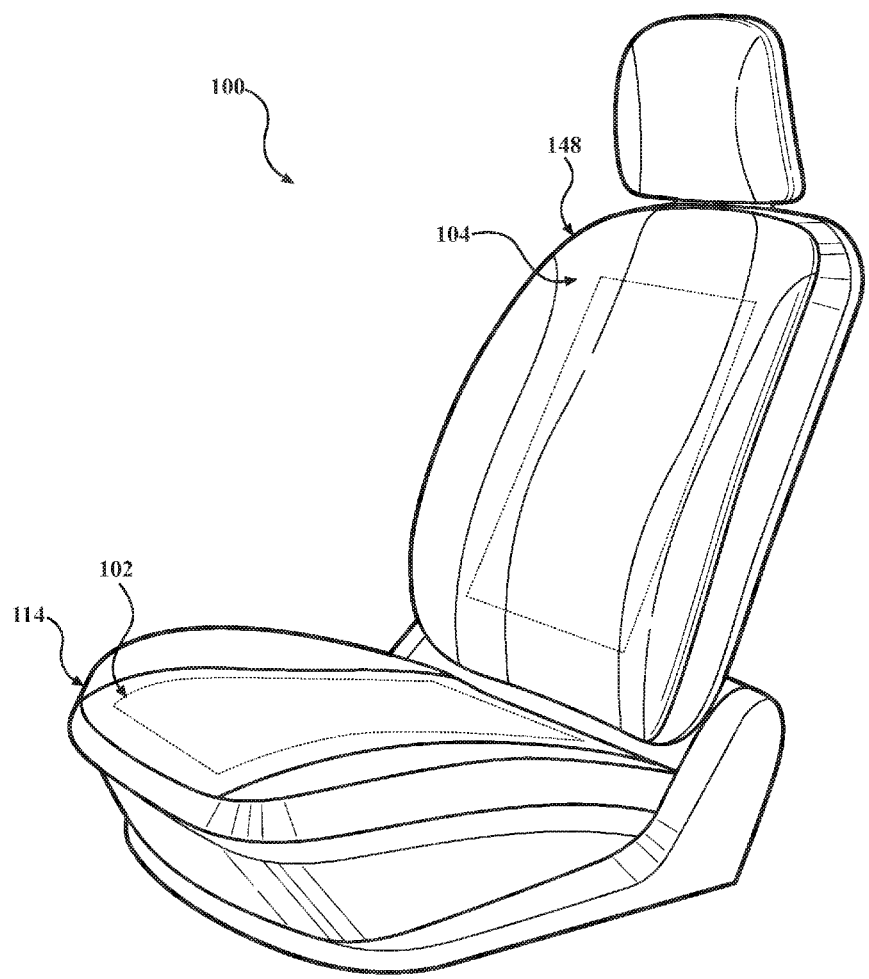
FIG. 1 is a perspective view of one embodiment of a vehicle seat having a seat bottom and a seat back coupled to one another.

Referring to the Figures, wherein like numerals indicate like or corresponding parts throughout the several views, a vehicle seat 100 having two ventilation devices 102, 104 and two corresponding blower assemblies 106, 108 which comprise a plurality of permanent magnets 110 arranged to concentrate a flux in accordance with one exemplary embodiment is generally shown. In other embodiments, the vehicle seat can include more or fewer than two blower assemblies and corresponding arrays of permanent magnets. Each blower assembly 106, 108 may concentrate flux toward one direction or any number of directions, such that the blower assembly can have compact packaging and provides efficient ventilation of the occupant.

Figure 2:
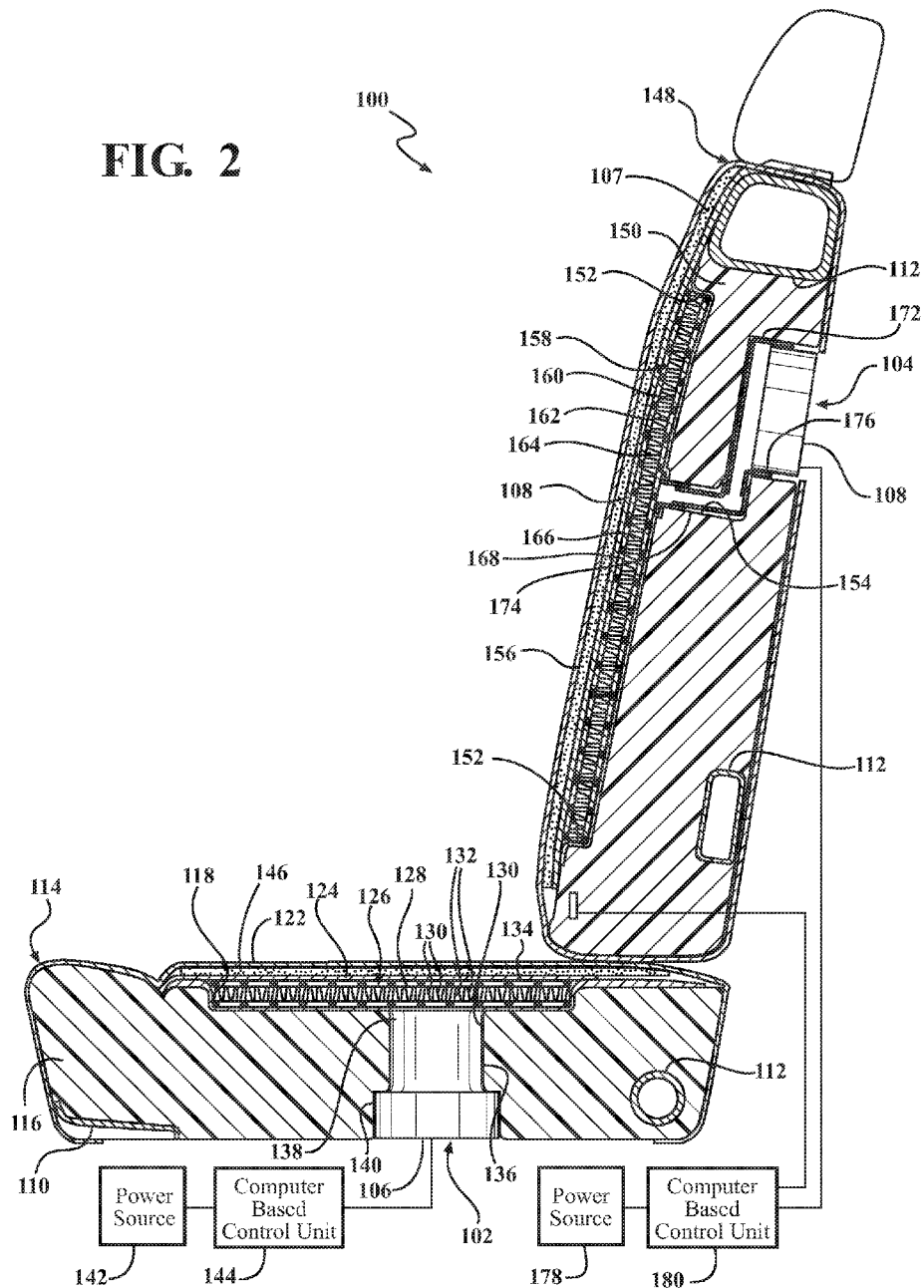
FIG. 2 is a cross-sectional view of the vehicle seat of FIG. 1, illustrating the vehicle seat having two ventilation devices in corresponding ones of the seat bottom and the seat back, with each ventilation device including a blower assembly.

Referring to FIGS. 1 and 2, the vehicle seat 100 can comprise a frame 112 and a seat bottom 114, which comprises a bottom cushion 116 coupled to the frame 112. In this embodiment, the bottom cushion 116 is a foam padding.

However, the bottom cushion can be comprised of any suitable material. The bottom cushion 116 defines a passage 118 and a center hole 120 for communicating with the same. The seat bottom 114 further comprises a seat cover 122 or Class A surface, which is comprised of a layer of permeable material that surrounds the bottom cushion 116. The vehicle seat 100 further comprises the ventilation device 102, which includes the blower assembly 106 mounted to the seat bottom 114.

The ventilation device 102 may further include a flow control layer 124 and a spacer mesh 126 disposed adjacent to Class A surface or seat cover 122. More specifically, the spacer mesh 126 is received within the passage 118 of the bottom cushion 116 such that the spacer mesh 126 can support the flow control layer 124 and fluidly communicate with the flow control layer 124, which in turn fluidly communicates with the permeable seat cover 122. In one embodiment, the spacer mesh 126 can have honeycomb support structure 128 comprising a shape complementary with the passage 118 formed in the bottom cushion 116 adjacent to the permeable seat cover 122. The honeycomb support structure 128 can be a three-dimensional mesh-like structure formed from one or more connected strands 130 of fiber or other flexible/ductile materials having a series of large voids 132 formed between the strands 130. The voids 132 are large enough to not significantly affect the flow of air through the passage 118 to the flow control layer 124 and through the permeable seat cover 122 for efficiently cooling an occupant seated on the seat bottom 114.

In certain embodiments, the honeycomb support structure 128 has a top surface 134 that is substantially coplanar with the bottom cushion 116. Moreover, the strands 130 are oriented and otherwise configured such that the honeycomb support structure 128 provides a level of resiliency and strength to allow the honeycomb support structure 128 to compress in a similar manner to the portion of the bottom cushion 116 as an occupant is seated upon the seat bottom 114 and recover to its original shape after an occupant is unseated from the seat bottom 114. Moreover, in the compressed state (i.e. when the seat bottom 114 is occupied), the depth and width of the passage 118 are substantially maintained to allow sufficient air to be drawn through the passage 118 to cool an occupant seated on the seat bottom 114. While the spacer mesh 126 and the passage 118 have complementary rectangular shapes extending across the seat bottom 114, it is contemplated that the spacer mesh and the passage can have any suitable complementary non-rectangular shapes that extend across a portion or entirety of the seat bottom. It is further contemplated that other embodiments of the ventilation device may not include a spacer mesh when, for example, the flow control layer is supported by integral reinforcements, or other separate layers, cushions, or other support elements. Other embodiments of the ventilation device 102 having more or fewer flow control layers and/or spacer meshes positioned on any portion of the vehicle seat are contemplated.

The ventilation device 102 further comprises a conduit 136, which is mounted about the bottom cushion 116 and comprises a pair of opposing ends 138, 140, including one end 138 fluidly communicating with the passage 118. In this embodiment, the conduit 136 is disposed within the center hole 120 of the bottom cushion 116. However, it is contemplated that the conduit can be mounted about the bottom cushion 116 in any other suitable arrangement.

The ventilation device 102 further comprises the blower assembly 106, which is only schematically shown in FIG. 2 with specific embodiments shown in FIGS. 3 through 19.

The blower assembly 106 may be mounted about the bottom cushion 116 and fluidly communicate with the opposite end 140 of the conduit 136. Preferably, the size of the blower assembly 106, in conjunction with the width, depth and number of passages, as well as the permeability of the seat cover 122, the range of permeability of the flow control layer 124, and the inner diameter of the conduit 136, are collectively configured to allow sufficient air to flow from the seat cover 122, through the flow control layer 124, the passage 118, and the conduit 136 to cool the seat cover 122 of the seat bottom 114 when the blower assembly 106 is activated. The blower assembly 106, in certain embodiments and as shown in FIG. 2, may be connected to a power supply unit 142 which delivers power to the blower assembly 106. In certain embodiments, the power supply unit 142 may also include a computer-based control unit 144 that controls the power supplied from the power supply unit 142 to the blower assembly 106 to control the ventilation of the seat bottom 114. The blower assembly 106 comprising the permanent magnets arranged for concentrating a flux is described in detail for FIGS. 3 through 19.

In certain other embodiments, the seat bottom 114 can further include one or more additional intermediate layers disposed between any adjacent pair from the group of the seat cover, the flow control layer, the spacer mesh, and the bottom cushion. As one example, intermediate layer can be comprised of foam padding or other suitable materials. Furthermore, the seat cover, the flow control layer, the spacer mesh, and the bottom cushion can be arranged in any suitable order. As but one example, the flow control layer can be disposed between the spacer mesh and the bottom cushion. As a further example, while the seat bottom 114 of FIG. 2 includes only one conduit 136, other embodiments of the seat bottom may include a plurality of conduits for communicating the Class A surface and the Class B surface with one another. Furthermore, while the seat bottom 114 of FIG. 2 includes only one spacer mesh 126, other embodiments of the seat bottom may include two spacer meshes with one of the spacer meshes being disposed proximal to the seat cover or Class A surface and the other spacer mesh being disposed proximal to the Class B surface that is distal to the seat cover. While the seat bottom 114 of FIG. 2 includes only one spacer mesh 126 disposed adjacent to the Class A surface, still other embodiments of the seat bottom may include only one spacer mesh disposed adjacent to the Class B surface that is distal to the seat cover 122.

The seat bottom 114 further includes a foam padding layer 146 sandwiched between the seat cover 122 and flow control layer 124. One non-limiting benefit of this configuration of the spacer mesh 126 and the conduits is that the flow of air can be evenly distributed across the flow control layer 124. However, this exemplary seat bottom 114 can provide various other suitable benefits.

The vehicle seat 100 further comprises a seat back 148 and the ventilation device 104 mounted to the seat back 148. The seat back 148 is coupled to the frame 112, such that the seat bottom 114 and the seat back 148 are indirectly coupled to one another by the frame 112. In this embodiment, the seat back 148 includes a back cushion 150, which is comprised of foam padding. However, the back cushion can be comprised of any suitable material. The back cushion 150 defines a passage 152 and a center hole 154 for communicating with the same. The seat back 148 further comprises a seat cover 156 or Class A surface, which is comprised of a layer of permeable material that surrounds the back cushion 150.

The vehicle seat 100 further comprises the ventilation device 104, which includes a flow control layer 158 mounted about the back cushion 150 and underneath the seat cover 156. A spacer mesh 160 may be positioned within the passage 152 of the back cushion 150 to support the flow control layer 158 and fluidly communicate with the flow control layer 158, which in turn fluidly communicates with the permeable seat cover 156. In one embodiment, the spacer mesh 160 can have honeycomb support structure 162 comprising a shape complementary with passage 152 formed in the back cushion 150 adjacent to the permeable seat cover 156. The honeycomb support structure can be a three-dimensional mesh-like structure formed from one or more connected strands 164 of fiber or other flexible/ductile materials having a series of large voids 166 formed between the strands 164. The voids 166 are large enough to not significantly affect the flow of air through the passage 152 to the first plurality of slits and the second plurality of slits and through the permeable seat cover 156 for efficiently cool an occupant seated against the seat back 148.

In certain embodiments, the honeycomb support structure 162 has a top surface 168 that is substantially coplanar with the back cushion 150. Moreover, the strands 164 are oriented and otherwise configured such that the honeycomb support structure 162 provides a level of resiliency and strength to allow the honeycomb support structure 162 to compress in a similar manner to the portion of the back cushion 150 as an occupant is seated against the seat back 148 and recover to its original shape after an occupant is unseated from the seat back 148. Moreover, in the compressed state (i.e. when the seat back 148 is occupied), the depth and width of the passage 152 are substantially maintained to allow sufficient air to be drawn through the passage 152 for cooling an occupant seated against the seat back 148. While the spacer mesh 160 and the passage 152 have complementary rectangular shapes extending across the seat back 148, it is contemplated that the spacer mesh and the passage can have any suitable complementary non-rectangular shapes that extend across a portion or entirety of the seat back. It is further contemplated that other embodiments of the ventilation device may not include a spacer mesh when, for example, the flow control layer is supported by integral reinforcements, or other separate layers, cushions, or other support elements. Other embodiments of the ventilation device 102 having more or fewer flow control layers and/or spacer meshes positioned on any portion of the vehicle seat are contemplated.

The ventilation device 104 further comprises a conduit 172, which is mounted about the back cushion 150 and comprises a pair of opposing ends 174, 176, including one end 174 fluidly communicating with the passage 152. In this embodiment, the conduit 172 is disposed within the center hole 154 of the back cushion 150. However, it is contemplated that the conduit can be mounted about the back cushion 150 in any other suitable arrangement The ventilation device 104 further comprises the blower assembly 108, which is only schematically shown in FIG. 2 with specific embodiments shown in FIGS. 3 through 19. The blower assembly 108 may be mounted about the back cushion 150 and fluidly communicates with the opposite end 176 of the conduit 172. Preferably, the size of the blower assembly 108, in conjunction with the width, depth and number of passages, as well as the permeability of the seat cover 156, the range of permeability of the flow control layer 158, and the inner diameter of the conduit 172, are collectively configured to allow sufficient air to flow from the seat cover 156, through the flow control layer 158, the passage 152, and the conduit 172 for cooling an occupant seated against the seat back 148 when the blower assembly 108 is activated. The blower assembly 108, in certain embodiments and as shown in FIG. 2, is connected to a power supply unit 178 which delivers power to the blower assembly 108. In certain embodiments, the power supply unit 178 may also include a computer-based control unit 180 that controls the power supplied from the power supply unit 178 to the blower assembly 108 to control the ventilation of the seat back 148. Other embodiments of the seat back having one or more passages, and one or more spacer meshes adjacent to the Class A surface and/or the Class B surface are contemplated. The blower assembly 106 comprising the permanent magnets arranged for concentrating a flux is described in detail for FIGS. 3 through 19.

In other embodiments, the seat back can further include one or more additional or intermediate layers disposed between any adjacent pair from the group of the seat cover, the flow control layer, the spacer mesh, and the back cushion. This intermediate layer can be comprised of foam padding or other suitable materials. Furthermore, the seat cover, the flow control layer, the spacer mesh, and the back cushion can be arranged in any suitable order. As one example, the flow control layer can be disposed between the spacer mesh and the back cushion.

Figure 3:
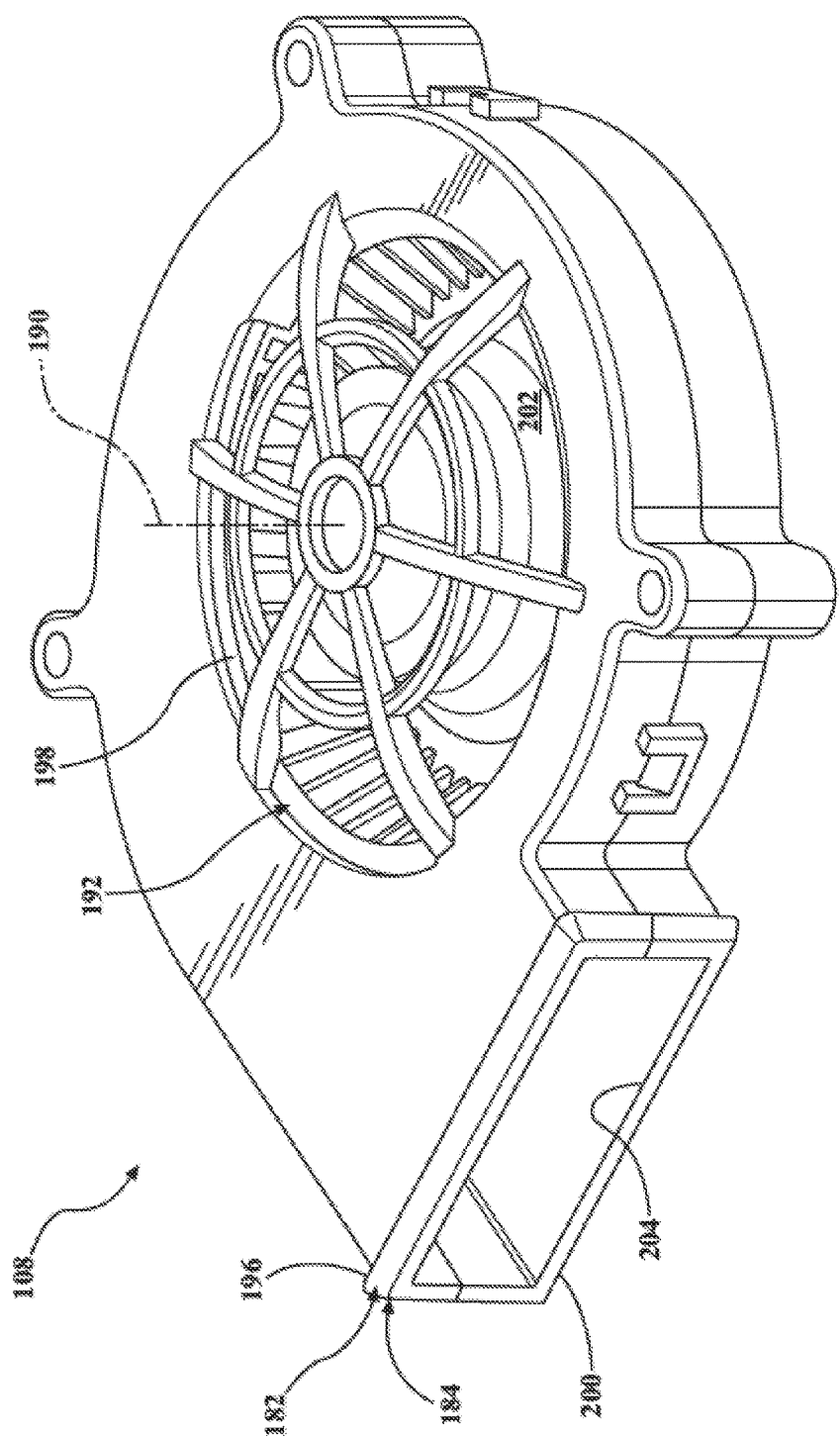
FIG. 3 is a perspective view of the blower assembly of FIG. 2, illustrating the blower assembly having a volute housing including a top portion and a bottom portion.
Figure 4:
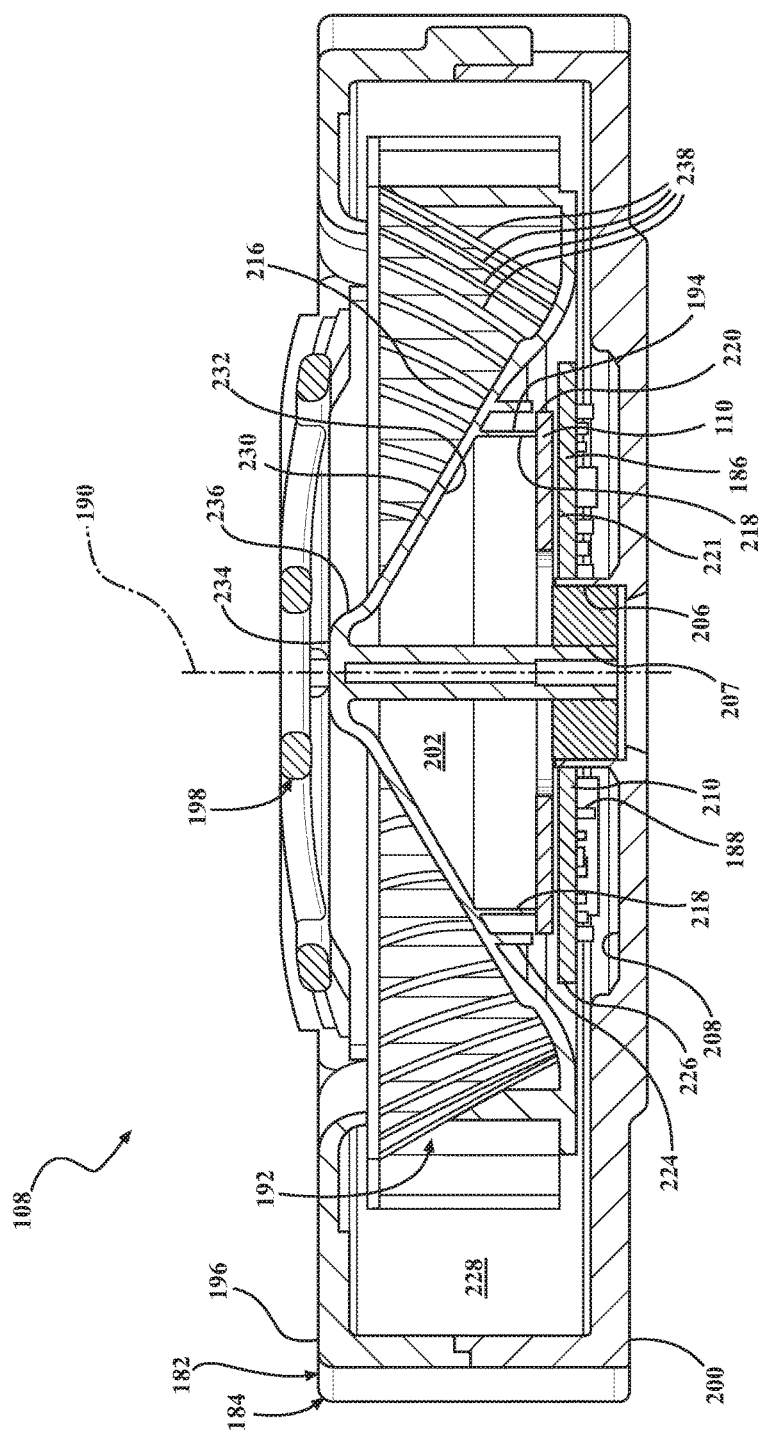
FIG. 4 is a cross-sectional view of the blower assembly of FIG. 3, illustrating the blower assembly having a stator mounted to the volute housing, a plurality of driving coils mounted to the stator, a rotor rotatably mounted to the housing, a plurality of permanent magnets mounted to the rotor, and an impeller mounted to the rotor, with the stator, the driving coils, the rotor, the magnets, and the impeller positioned within the housing.
Figure 5:
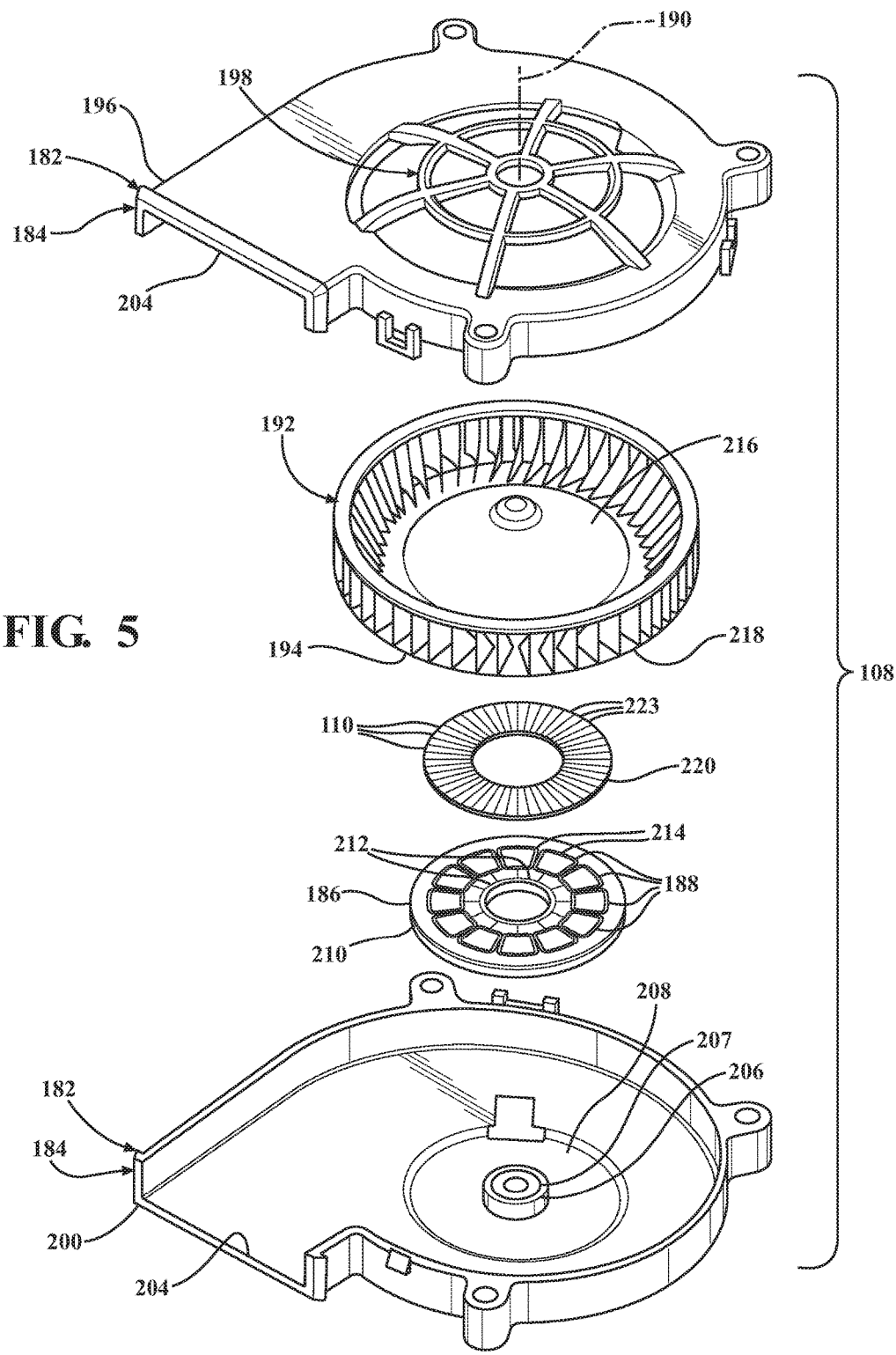
FIG. 5 is an exploded view of the blower assembly of FIG. 3.

Referring to FIGS. 3 through 5, one embodiment of the blower assembly 108 coupled to the seat back 148 is illustrated. In the illustrated embodiment, the blower assembly 108 generally comprises a housing 182, a stator 186 mounted to the housing 182 and comprising a plurality of driving coils 188, a rotor 194 rotatably coupled to the housing 182 about a rotational axis 190 and comprising a plurality of permanent magnets 110 arranged to generate a flux concentrated on the driving coils 188, and an impeller 192 coupled to the rotor 194 to rotate about the rotational axis to generate a flow of air. It is contemplated that the blower assembly 106 coupled to the seat bottom 114 may be similar to the blower assembly 108 coupled to the seat back 148 and have the same or similar parts. However, it is contemplated that the blower assemblies 106, 108 can have the similar or different components arranged in configurations that are different from one another.

More specifically, in the illustrated embodiment, the housing 182 may comprise a volute housing 184 having a top portion 196 that defines an inlet 198 positioned along the rotational axis 190 for receiving the supply of air flowing along the rotational axis 190 from the passage 152 (FIG. 2) of the seat back 148 to draw air from the seat cover 122. The volute housing 184 may further comprise a bottom portion 200 mounted to the top portion 196 to define a cavity 202 between the top and bottom portions 196, 200, with the rotor 194 and the impeller 192 positioned within the cavity 202. The cavity 202 fluidly communicates with the inlet 198 to receive the supply of air from the inlet 198. In the illustrated embodiment, the top and bottom portions 196, 200 define an outlet 204 having one end fluidly communicating with the cavity 202 to receive the flow of air from the impeller 192. The outlet 204 may further have an opposing end fluidly ductwork (not shown) of the seat back 148 to exhaust air from the vehicle seat through the ductwork. The bottom portion 200 comprises a seat 206, which is positioned on the rotational axis 190 and includes a bearing 207 within the seat 206. The bottom portion 200 of the volute housing 184 further comprises an annular recess 208, which is positioned about the seat 206 and receives the stator 186 within the recess 208 for mounting the stator 186 to the housing 182.

While the volute housing 184 of FIGS. 3 through 5 may have top and bottom portions 196, 200 defining the cavity 202 between the top and bottom portions 196, 200, it is contemplated that other embodiments of the housing may have any number of parts arranged in any configuration with respect to one another to define a cavity. Furthermore, while the top portion 196 of the volute housing 184 of FIGS. 3 through 5 defines the inlet 198 for receiving the supply of air in the axial direction along the rotational axis 190, other embodiments of the inlet may be formed in any portion of the housing for receiving a supply of air from any direction. In addition, while the top and bottom portions 196, 200 of the volute housing 184 of FIGS. 3 through 5 define the outlet 204 for receiving the flow of air from the impeller 192, the top portion, the bottom portion, or any one or more portions of the housing can define the outlet.

The blower assembly 108 further includes the stator 186 coupled to the volute housing 184 and the rotor 194 rotatably coupled to the volute housing 184 about the rotational axis 190. The permanent magnets 110 may be mounted to the rotor 194, and the driving coils 188 may be mounted to the stator 186

In the illustrated embodiment, the stator 186 comprises the driving coils 188. More specifically, the stator 186 may comprise a PCB substrate 210 and a plurality of traces 212 printed on the PCB substrate 210, with the driving coils 188 coupled to the traces 212. For example, the driving coils 188 may comprise field coils 214 soldered to the traces 212, which may be comprised of copper or other conductive materials. Furthermore, the rotor 194 may comprise a first side 216 and a second side 218 facing the stator 186. The permanent magnets 110 may be arranged on the second side 218 to concentrate the flux toward the driving coils 188, and the first side 216 of the rotor 194 may be free of the permanent magnets 110.

Figure 6:
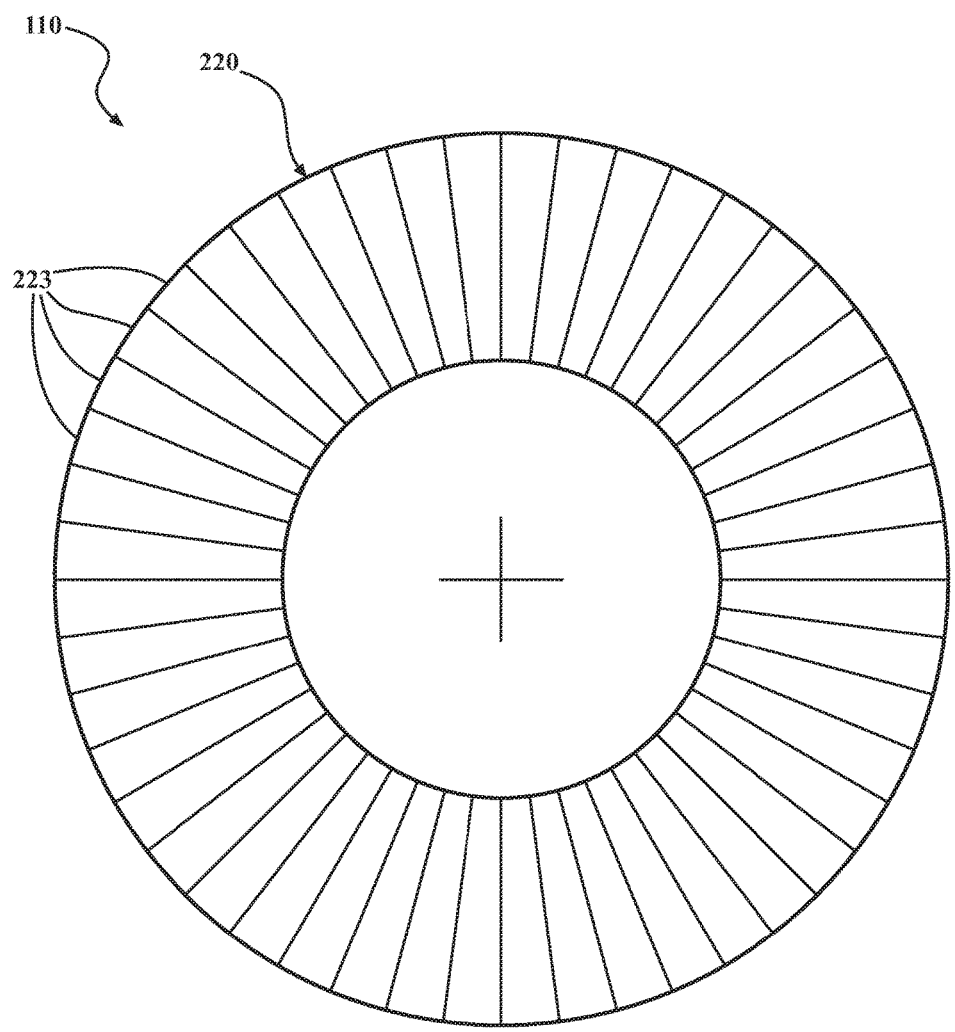
FIG. 6 is a top plan view of the arrangement of magnets shown in FIG. 5.
Figure 7:
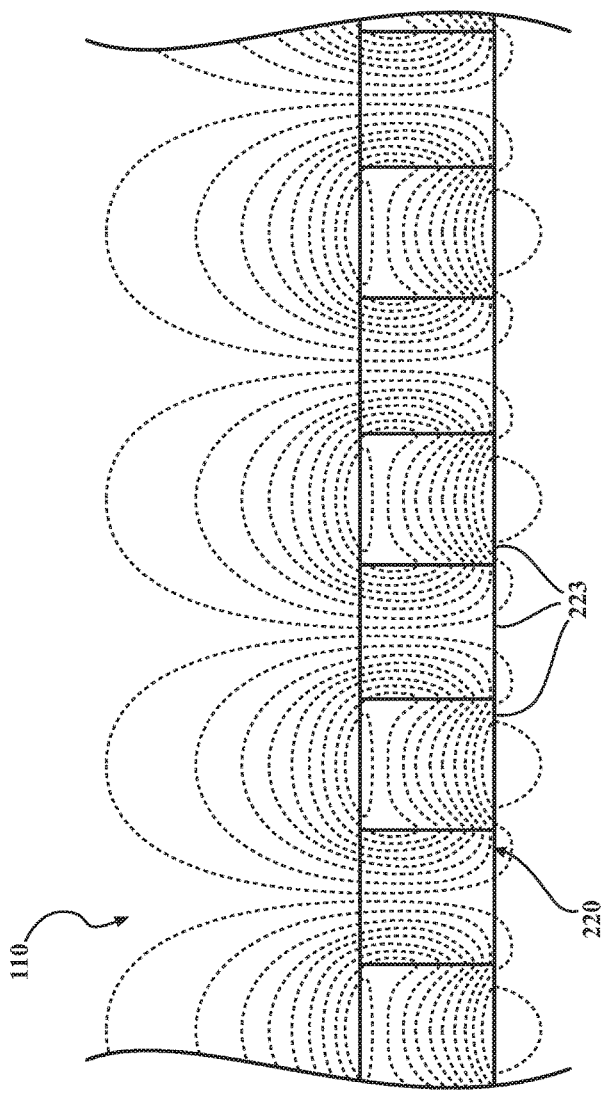
FIG. 7 is a schematic enlarged side view of the magnets of FIG. 6 to illustrate the magnets concentrating a flux toward one side.
Figure 8:
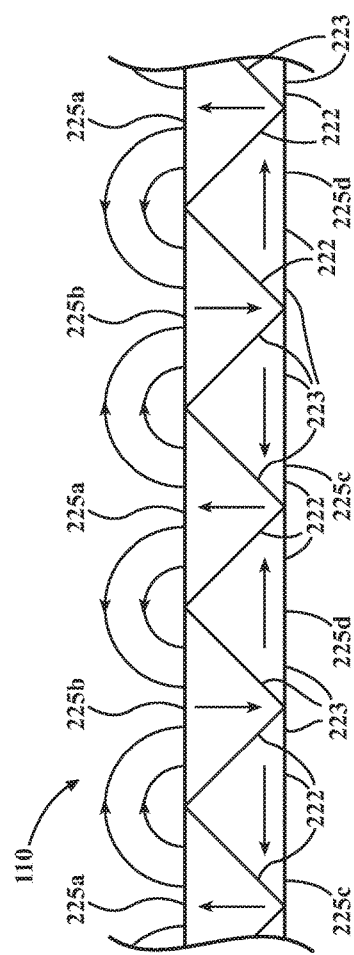
FIG. 8 is a schematic view of the magnets of FIG. 7 to illustrate the magnets having a plurality of poles arranged in a plurality of orientations to concentrate the flux toward one side.

Referring to FIGS. 6 through 8, the permanent magnets 110 may be arranged in a concentrated array 220, such as a Halbach Array, to concentrate the flux toward the driving coils 188. The concentrated array 220 has a particular arrangement of permanent magnets that augments the magnetic field on the second side 218 of the rotor 194 while cancelling the field to near zero on the first side 216 of the rotor 194. This is achieved by having a spatially rotating or alternating pattern of magnetization, as exemplified in FIG. 8, which allows the concentration of the magnetic field to be present on only one side of the rotor 194. One benefit is that the field produced is significantly stronger than other arrays having the same amount of the magnet alloy. The arrangement essentially increases the efficiency of the magnetic circuit. The by-product is that there is only one working surface or "working face." The one working-face, where the magnetic field resides, is strong as compared to the non-working face, which has essentially no field. Put another way, the magnetic field, which would normally be present on the non-working face, is rerouted to the working-face.

A Halbach Array 220, which is one type of concentrated array, is shown in FIG. 8 and is configured to produce a magnetic field utilizing permanent magnets 110 with the orientation of adjacent, consecutive magnets 110 alternating by 90°, which amplifies the magnetic force applied by the Halbach Array 220. Halbach Arrays, both planar and circular, can produce a magnetic field similar to what a powered solenoid (electromagnet) would create, but without the extra size, cost, and maintenance. Planar Halbach Arrays may contain the magnetic field to one side of the array, while a Circular Halbach Array can concentrate the magnetic field on the inner diameter or outer diameter surface. Other iterations exist as well, and although the orientation of "bucking magnets" provides a 45° angle between magnets instead of a 90° iteration, they can be considered "non-traditional" Halbach Arrays. For Circular Halbach Arrays, the simplest geometry is an arrangement of wedge shape magnets, with various magnetic orientations around a common axis.

The permanent magnets 110 may comprise a plurality of north-south pole regions 222 arranged to alternate between two to six orientations. In the embodiment shown in FIG. 8, the pole regions 222 arranged to alternate between four orientations, with magnet segments 225*a* having a pole region arranged in an orientation directed toward the driving coils. Magnet segments 225*b* have a pole region arranged in an orientation directed distal from the driving coils. Magnet segments 225*c* have a pole region arranged in an orientation directed in a first lateral direction within a plane of the Halbach Array 220. Magnet segments 225*d* have a pole region arranged in an orientation directed in a second lateral direction opposite to the first lateral direction and within the plane of the Halbach Array 220.

As shown in FIGS. 7 and 8, the permanent magnets 110 may be arranged to transition between orientations at least twelve times, and the permanent magnets 110 may comprise between 16 and 60 magnet segments mounted to the rotor 194. These configurations provide exemplary embodiments of the concentrated array 220 that concentrates the flux toward the driving coils 188, with a majority portion of the flux extending from the second side 218 of the rotor 194 and merely stray amounts of flux extending from the first side 216 of the rotor 194. However, any number and type of magnets, such as magnet segments, electromagnets, or magnetic material embedded with the impeller, are contemplated.

The magnetic field only being present on one side of the rotor 194 allows the rotor 194 to be compact and additionally the blower assembly 108 to be compact. As best shown in FIG. 6, when using the concentrated array 220, an axial gap 221 is defined as the distance between the rotor 194 and the coils 188 of the stator 186. Specifically, the concentrated array 220 applied to the rotor 194 permits a minimum axial gap 221 of the blower assembly 108. The minimum axial gap 221 enables the blower assembly 108 to be manufactured compact. As such, in the preferred embodiment magnets 110 and coils 118 are present only on or adjacent to one side of the rotor 194. However, any other configuration of the permanent magnets or patterns of magnetic material that concentrate the flux toward the driving coils are contemplated.

Each one of the rotor 194 and the stator 186 may comprise an outer diameter surface 224, 226 positioned about the rotational axis 190, with a region 228 radially surrounding the outer diameter surface 224, 226 being free of the driving coils 188 and the permanent magnets 110. A combined height of the stator 186 and the rotor 194 positioned within the volute housing 184 is no greater than 10 millimeters, and a diameter of at least one of the stator 186 and the rotor 194 is between 20 and 60 millimeters. This arrangement can provide an efficient and compact configuration of the blower assembly 106 to facilitate installation of the same within the vehicle seat. However, it is contemplated that the stator and the rotor can have any combined height and/or any diameter.

In this embodiment, the rotor 194 is an integral portion of the impeller 192 for rotating about the rotational axis 190 to generate a flow of air through the passage 118. The impeller 192 may further comprise a center hub portion 236 positioned on the rotational axis 190, and the impeller 192 may comprise a first surface 230 and a second surface 232 facing the rotor 194. The first surface 230 terminates at a point 234 on the center hub portion 236 adjacent to the top portion 196 of the housing 182, and the first surface 230 extends radially outward to a plurality of blades 238 positioned about the center hub portion 236, for directing a supply of air toward the blades 238. However, any impeller configuration is contemplated.

Figure 9:
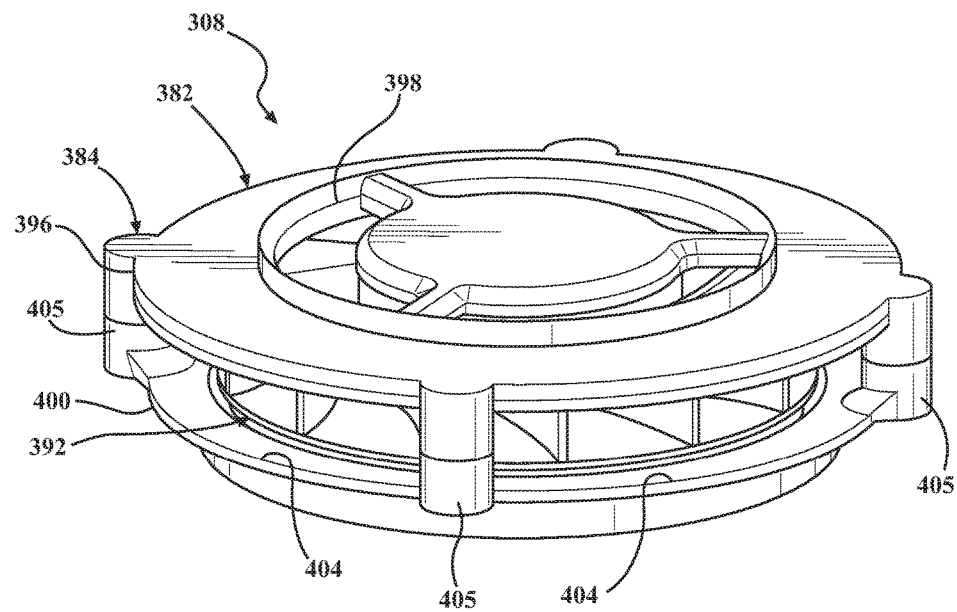
FIG. 9 is a perspective view of another embodiment of a blower assembly, illustrating the blower assembly having a cage housing comprising a top plate, a bottom plate spaced from the top plate, a plurality of posts connecting the top and bottom plates to one another, and an impeller positioned between the top and bottom plates.
Figure 10:
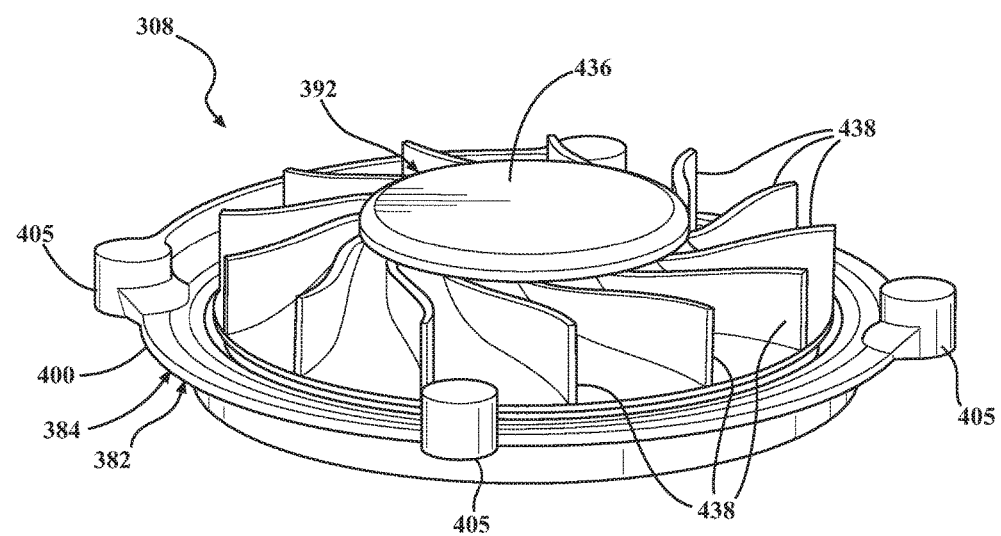
FIG. 10 is a perspective view of the blower assembly of FIG. 9, with the top plate of the housing removed to illustrate the impeller.
Figure 11:
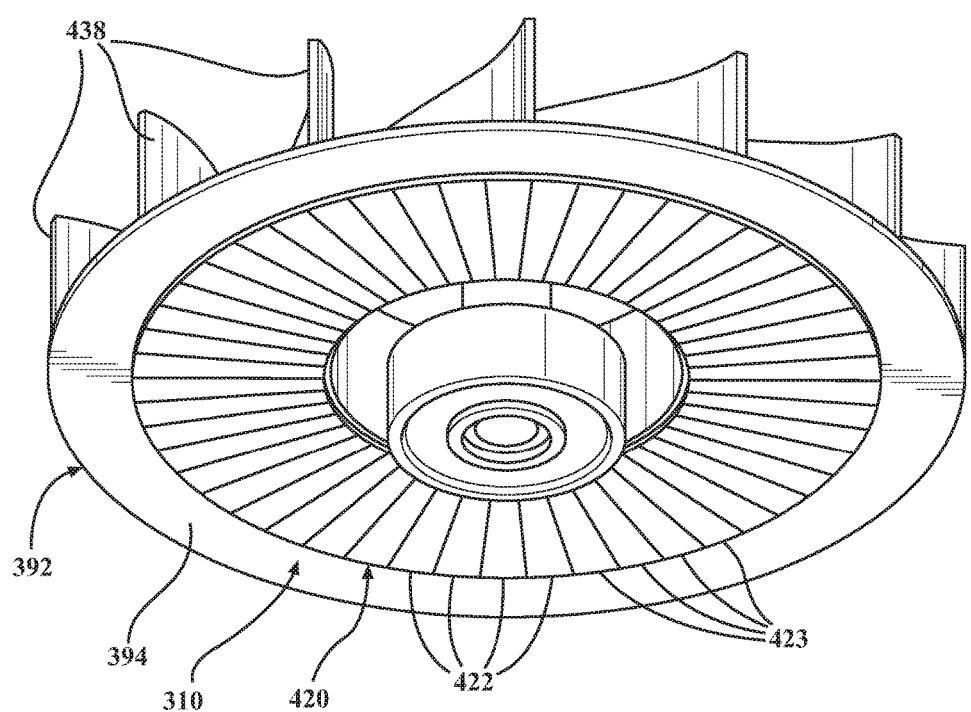
FIG. 11 is a bottom perspective view of the impeller of FIG. 10, illustrating a plurality of permanent magnets mounted to the impeller.

Referring to FIGS. 9 through 11, another embodiment of a blower assembly 308 is similar to the blower assembly 108 of FIGS. 3 through 5, and the blower assembly 308 of FIGS. 9 through 11 includes similar or corresponding components identified by the same reference numbers increased by 200. However, while the blower assembly 108 of FIGS. 3 through 5 comprises the housing 182 in the form of the volute housing 184, the blower assembly 308 of FIGS. 9 through 11 may comprise the housing 382 in the form of a cage housing 384. The cage housing 384 may comprise a top plate 396 having an inlet 398 positioned along the rotational axis 390 for receiving a supply of air along the rotational axis 390 from the passage 152 to draw air from the seat cover 122. The cage housing 384 may further comprise a bottom plate 400 spaced from the top plate 396 to define a plurality of outlets 404 positioned about the rotational axis 390. A plurality of posts 405 may connect the top and bottom plates 396, 400 to one another, with the rotor 394 and the impeller 392 positioned between the top and bottom plates 396, 400 to receive the supply of air from the inlet 398 and direct the flow of air through the outlets 404 to ductwork for exhausting air from the vehicle seat through the ductwork.

Figure 12:
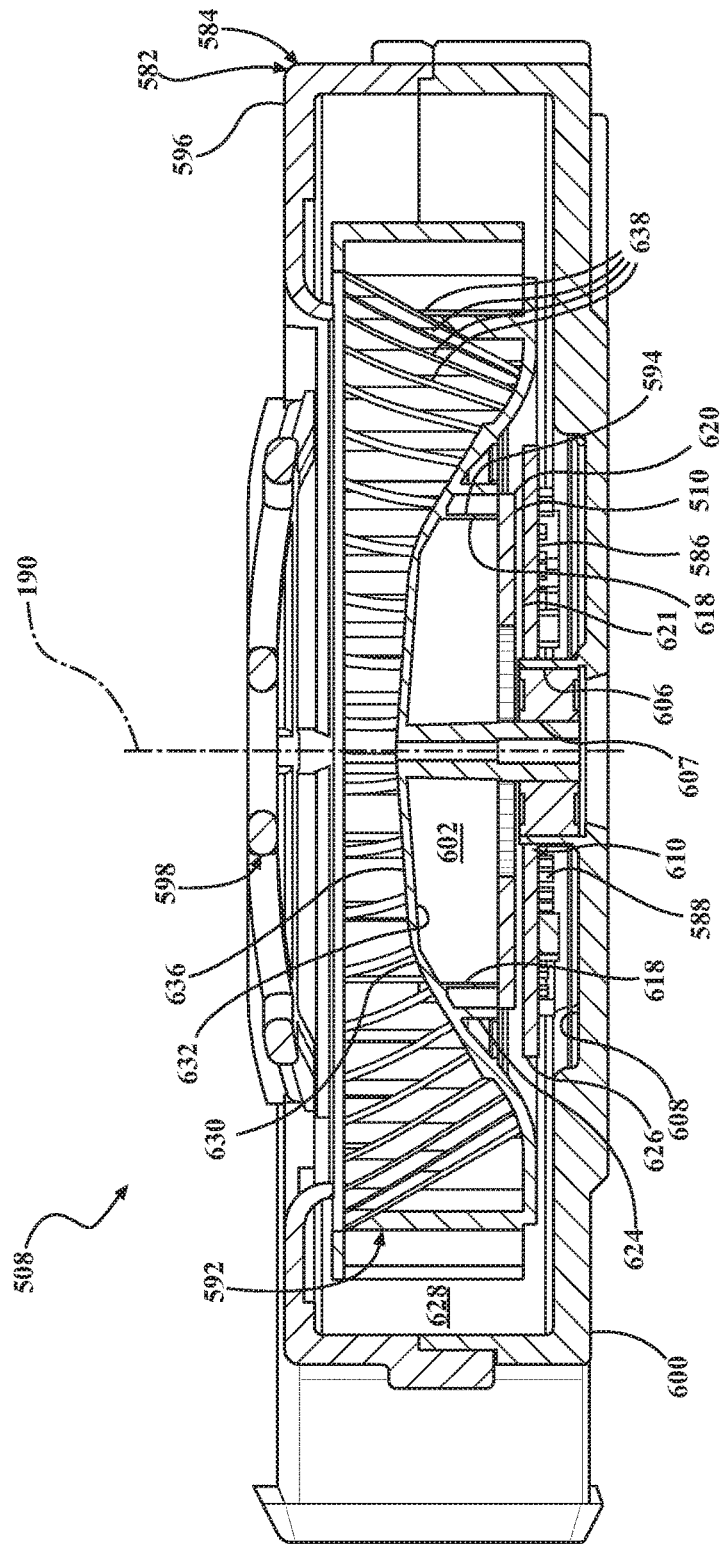
FIG. 12 is a cross-sectional view of yet another embodiment of a blower assembly, illustrating the blower assembly having another exemplary impeller configuration having a center hub portion positioned on a rotational axis, a plurality of blades positioned about the rotational axis, and a surface directing a supply of air from the center hub portion to the blades.

Referring to FIG. 12, yet another embodiment of a blower assembly 508 is similar to the blower assembly 108 of FIG. 4, and the blower assembly 508 of FIG. 12 includes similar or corresponding components identified by the same reference numbers increased by 400. However, while the blower assembly 108 of FIG. 4 comprises the impeller 192 with the first surface 230 terminating at the point 234 on the center hub portion 236 adjacent to the top portion 196 of the housing 182, the blower assembly 508 of FIG. 12 comprises an impeller 592 having a first surface 630 on a center hub portion 636 facing the top portion 596 of the housing 582 and spaced apart from the top portion 596 of the housing 582 for providing space for a flow of air into the blower assembly 508 toward the blades 638.

Figure 13:
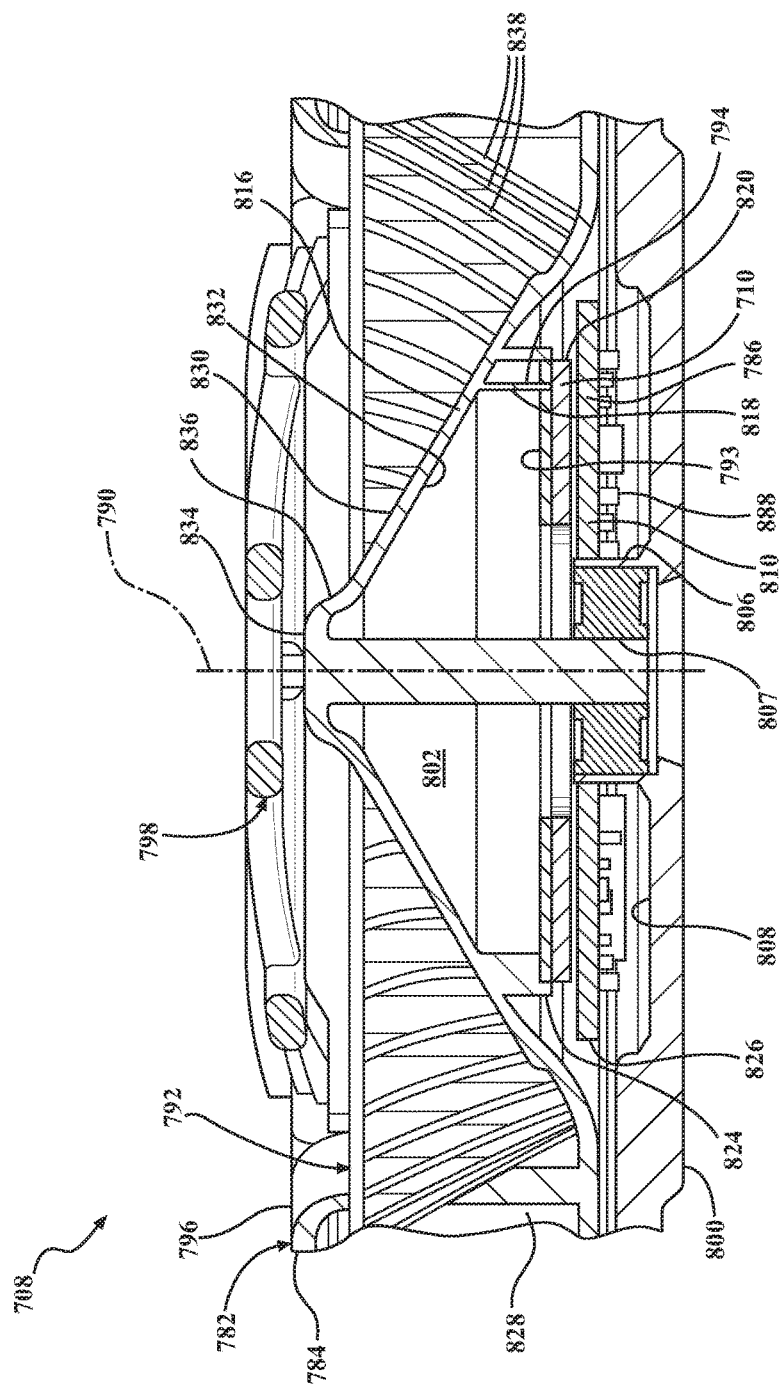
FIG. 13 is a cross-sectional view of still another embodiment of a blower assembly, illustrating the blower assembly having a magnetic flux plate.

Referring to FIG. 13, another embodiment of a blower assembly 708 is similar to the blower assembly 108 of FIG. 4, and the blower assembly 708 of FIG. 13 includes similar or corresponding components identified by the same reference numbers increased by 600. However, the blower assembly 708 of FIG. 13 further comprises a flux plate 793 mounted to the impeller 792, and the permanent magnets AA are mounted to the flux plate 793. The flux plate 793 shields the impeller 792 from the flux and redirects the flux toward the driving coils 788. However, other embodiments of the blower assembly 708 may not comprise the flux plate.

Figure 14:
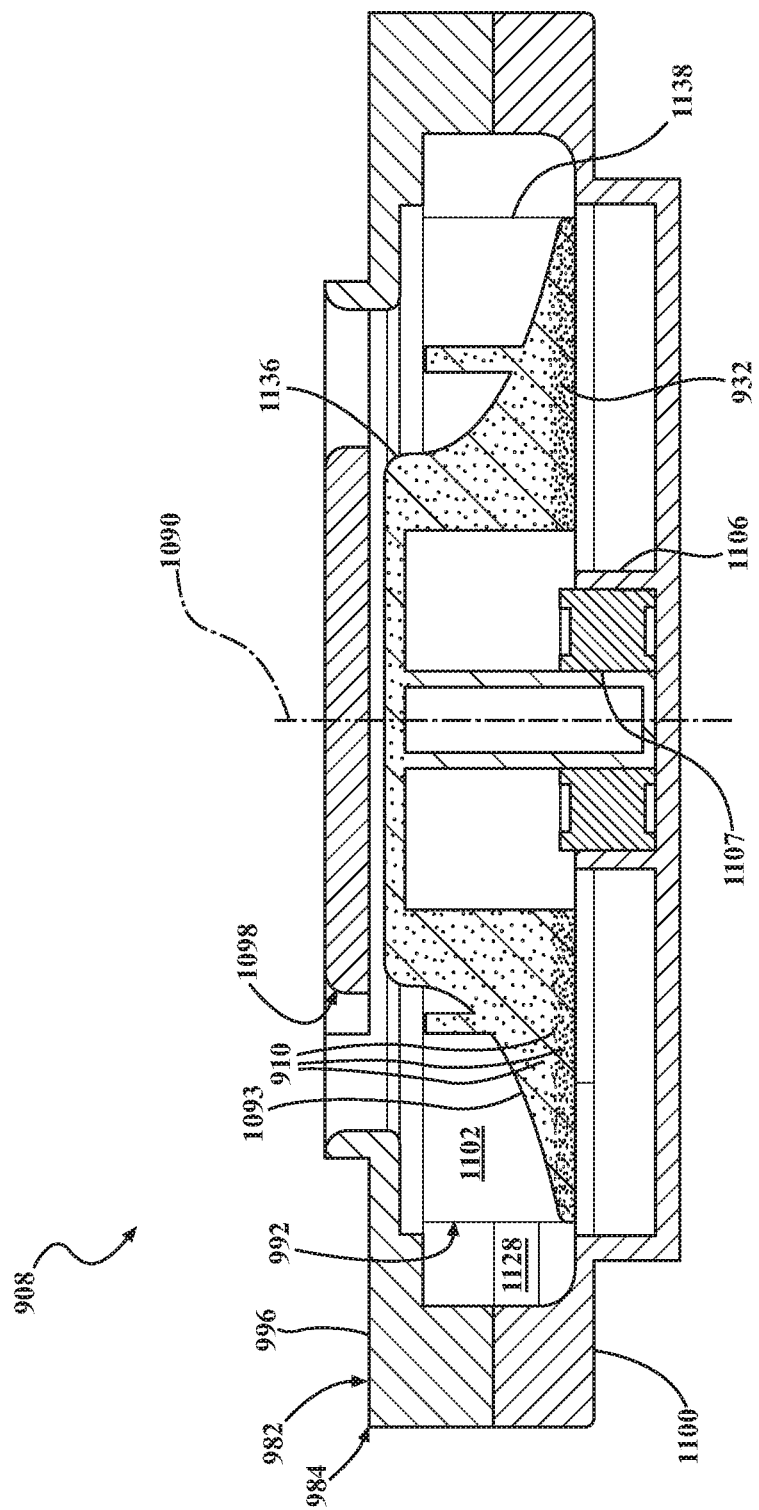
FIG. 14 is a cross-sectional view of still another embodiment of a blower assembly, illustrating the blower assembly having an impeller comprising a plastic binder material and magnetic material embedded within the plastic binder material.

Referring to FIG. 14, another embodiment of a blower assembly 908 is similar to the blower assembly 108 of FIG. 4, and the blower assembly 908 of FIG. 14 includes similar or corresponding components identified by the same reference numbers increased by 800. For illustration purposes only, the blower assembly 908 is shown without the stator and the driving coils. While the blower assembly 108 of FIG. 4 comprises the separate arrangement of permanent magnets 110 mounted to a side of the impeller 192 for facing the driving coils, the blower assembly 908 of FIG. 14 may include an impeller 992 comprising a plastic binder material 1093 and magnetic material 910 embedded within the plastic binder material 1093 and concentrated within a portion of the plastic binder material 1093 adjacent to the second side 932 of the impeller 992. In other words, the impeller 992/rotor is manufactured by metal impregnated polymeric material, which may have localized areas of metal impregnation. Stated another way, there may be areas where there is a higher concentration of metal than other areas. Preferably, the areas of higher concentration are near the surface facing the driving coils. In this embodiment, as well as others, the impeller and rotor are integrated into one part. In essence, the rotor is the base of the impeller. A plurality of materials can be added to the polymeric material and magnetized, such as, ferromagnetic materials, more specifically, iron, nickel, cobalt and some alloys of rare earth metals. Other embodiments of the blower assembly may include the rotor comprised of the plastic binder material and magnetic material embedded within a portion of the plastic binder material adjacent to the side of the rotor that faces the driving coils. However, other configurations of magnetic material are contemplated. The metal impregnated material may be polarized after the forming of the impeller.

Figure 15:
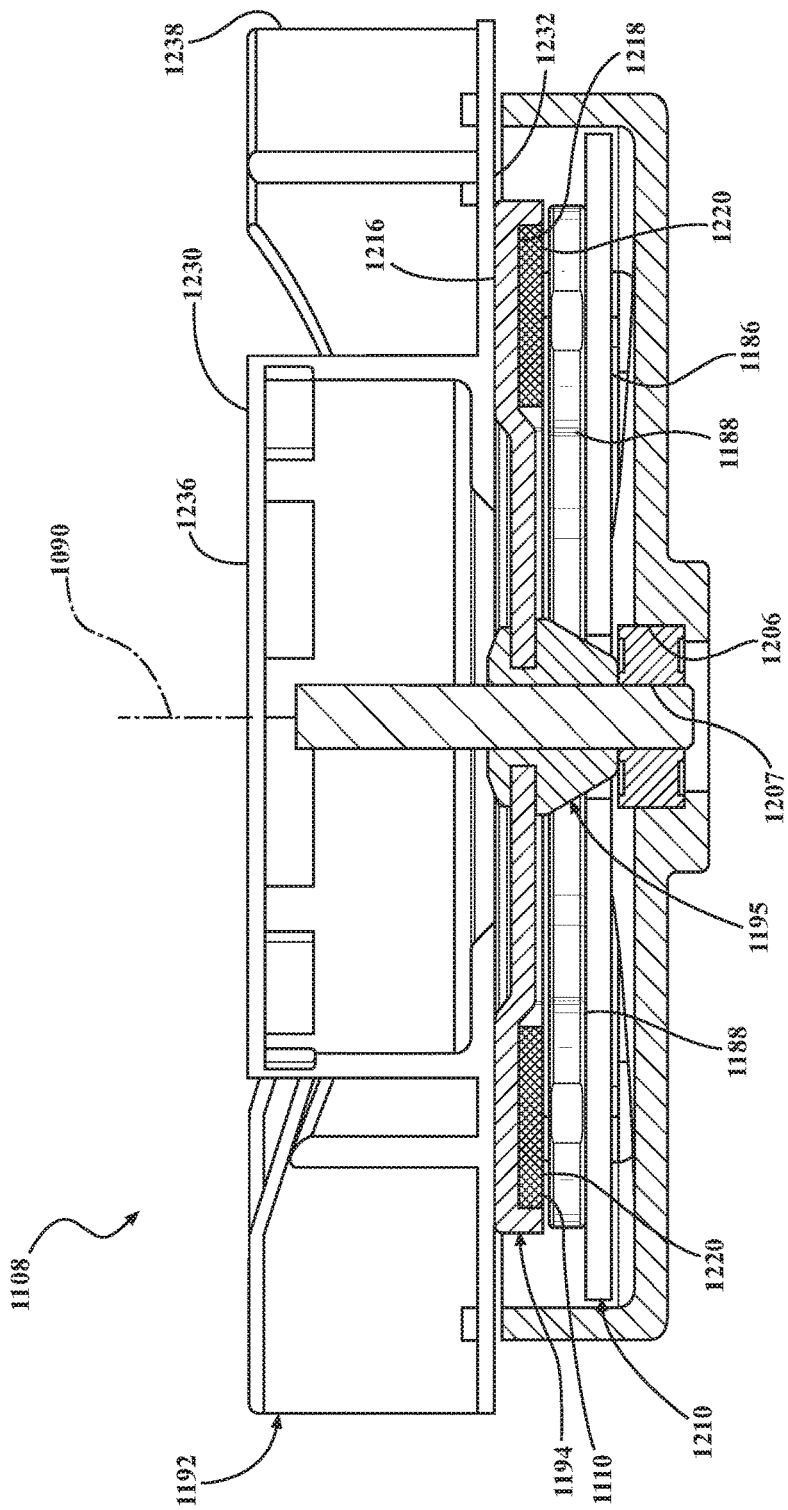
FIG. 15 is a cross-sectional view of another embodiment of blower assembly, with the housing removed to illustrate the blower assembly having an impeller and a separate rotor mounted to the impeller.
Figure 16:
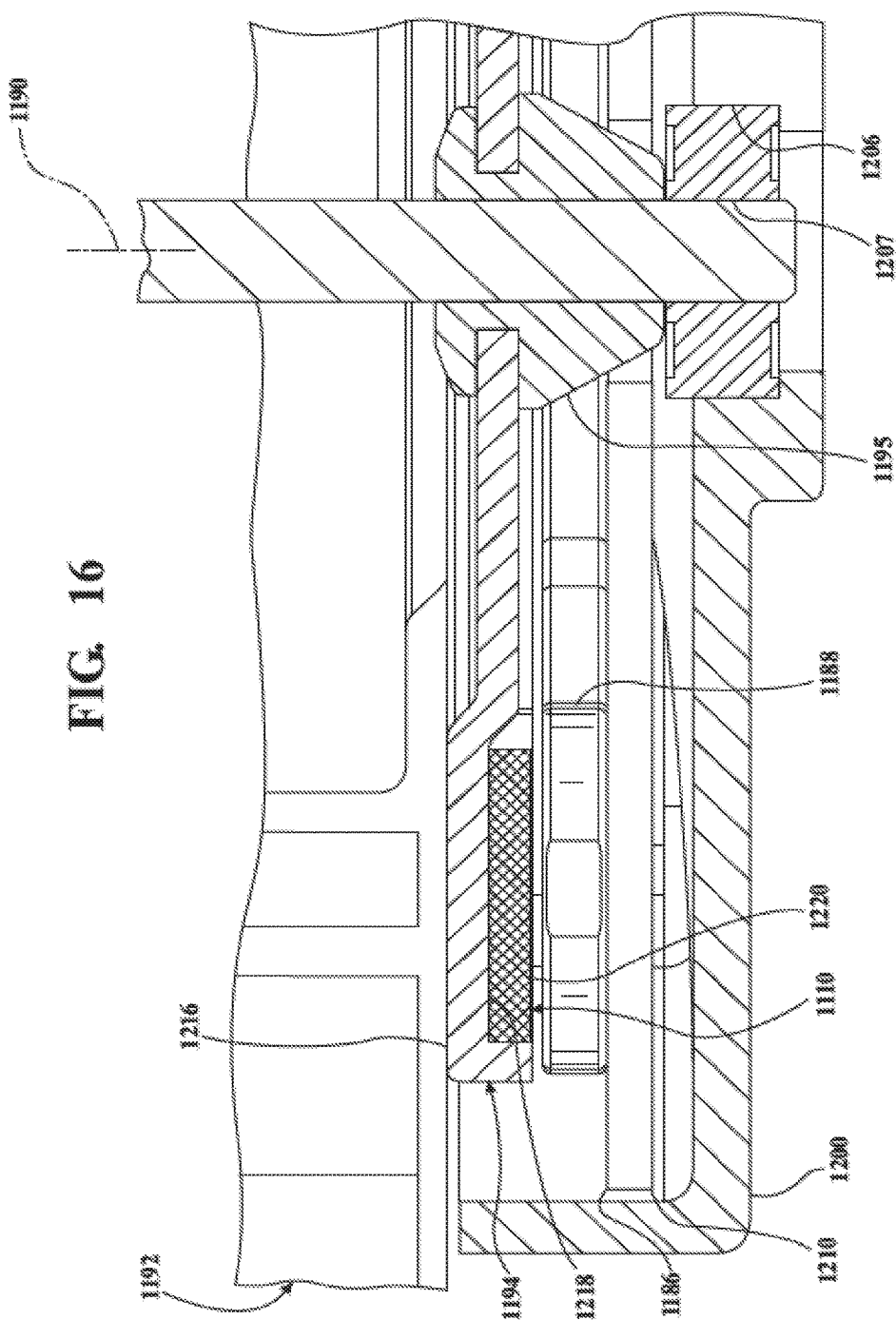
FIG. 16 is an enlarged view of one portion of the blower assembly of FIG. 15.

Referring to FIGS. 15 through 17, another embodiment of a blower assembly 1108 is similar to the blower assembly 108 of FIG. 4, and the blower assembly 1108 of FIGS. 15 through 17 includes similar or corresponding components identified by the same reference numbers increased by 1000. However, while the blower assembly 108 of FIG. 4 comprises the rotor 194 as an integral portion of the impeller 192, the blower assembly 1108 of FIGS. 15 through 17 comprises a separate rotor 1194 mounted directly to an impeller 1192 by at least one of a mechanical fastener 1195 and a chemical fastener. The blower assembly 1108 further comprises a plurality of permanent magnets 1110 secured to or formed in the rotor 1194. In particular, the magnets 1110 are formed around or directly molded into the rotor 1194. Specifically, the rotor 1194 is injection molded around the magnets 1110 with the magnets 1110 being on only one side of the rotor 1194 facing the driving coils. The magnets 1110 may be polarized before or after they are formed within the rotor 1194. Alternatively, the rotor may be manufactured by injecting molding with hollow cavities to house the magnets, with the magnets affixed to the rotor facing the driving coils. In other embodiments, the permanent magnets may be directly molded into the impeller or mounted to the impeller by a mechanical fastener or chemical fastener.

Figure 19:
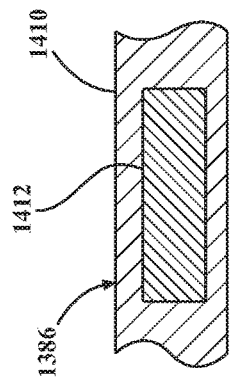
FIG. 19 is an enlarged cross-sectional view of one portion of the PCB, illustrating the PCB comprising a substrate and a plurality of driving windings embedded within the substrate.
Figure 18:
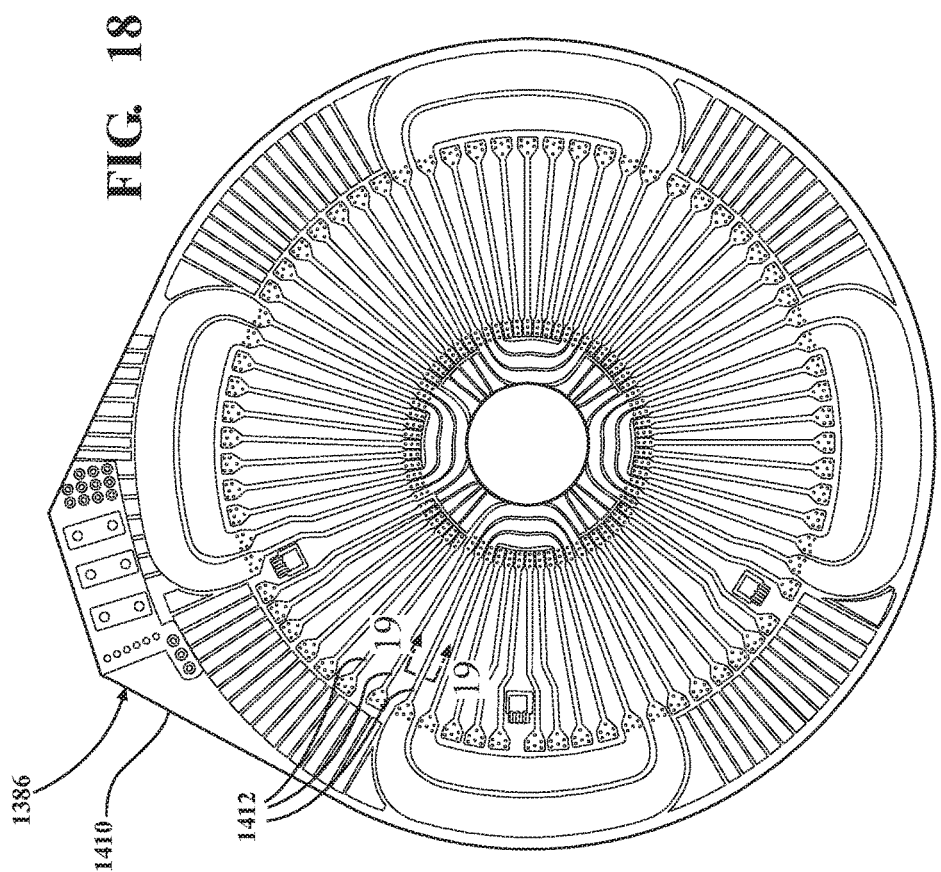
FIG. 18 is another embodiment of a PCB for the blower assembly of FIG. 3.

Referring to FIGS. 18 and 19, another embodiment of the stator 1386 is similar to the stator 186 of FIGS. 3 and 4, and the stator 1386 of FIGS. 18 and 19 includes similar or corresponding components identified by the same reference numbers increased by 1200. However, while the stator 186 of FIGS. 3 and 4 comprises the separate driving coils 188 coupled to copper traces 212 of the PCB substrate 210, the stator 1386 of FIGS. 18 and 19 comprises windings 1412 embedded within the PCB substrate 1410.

It is contemplated that the flow control layer can have any number of slits that are linear, curved, or non-linear stand-alone slits, or a plurality of slits intersecting one another. Also, the slits may be openings that do not fully close, and they may be arranged in a staggered pattern, linear rows, or any other uniform or non-uniform pattern.

The present inventions have been described herein in an illustrative manner, and it is to be understood that the terminology which has been used is intended to be in the nature of words of description rather than of limitation. Many modifications and variations of the present inventions are possible in light of the above teachings. The inventions may be practiced otherwise than as specifically described within the scope of the appended claims.

What is claimed is:

1. A vehicle seat comprising:
    a seat bottom having a bottom cushion;
    a seat back coupled to said seat bottom with said seat back having a back cushion;
    at least one of said bottom cushion and said back cushion having a passage; and
    a blower assembly coupled to one of said seat bottom and said seat back, with said blower assembly comprising:
        a housing;
        a stator coupled to said housing and comprising a plurality of driving coils;
        a rotor rotatably coupled to said housing about a rotational axis, said rotor comprising a plurality of permanent magnets arranged to generate a flux concentrated on said plurality of driving coils; and
        an impeller coupled to said rotor to rotate about said rotational axis to generate a flow of air through said passage;
        said rotor comprising a first side and a second side with said impeller mounted to said first side and said second side facing said stator, with said plurality of permanent magnets arranged in a concentrated array to generate said flux about said second side and in an axial direction toward said plurality of driving coils.

2. The vehicle seat of claim 1, wherein said plurality of permanent magnets is arranged in a Halbach array.

3. The vehicle seat of claim 1, wherein said plurality of permanent magnets comprises a plurality of patterns of magnetic material coupled to a substrate to define a concentrated array.

4. The vehicle seat of claim 1, wherein said plurality of permanent magnets are mounted to said second side in a concentrated array with said first side being free of said plurality of permanent magnets.

5. The vehicle seat of claim 1, wherein said plurality of permanent magnets comprises a plurality of pole regions arranged in two to six orientations to define a concentrated array.

6. The vehicle seat of claim 5, wherein said plurality of pole regions are arranged in four orientations.

7. The vehicle seat of claim 5, wherein said plurality of permanent magnets are arranged to transition between said plurality of orientations at least twelve times.

8. The vehicle seat of claim 1, wherein said plurality of permanent magnets comprises between 16 and 60 magnet segments.

9. The vehicle seat of claim 1, wherein each one of said rotor and said stator comprises an outer diameter surface positioned about said rotational axis, with a region radially surrounding said outer diameter surface being free of said plurality of driving coils and said plurality of permanent magnets.

10. The vehicle seat of claim 1, wherein said impeller further comprises a center hub portion positioned on said rotational axis and comprising a first surface and a second surface facing said rotor, said impeller further comprising a plurality of blades positioned about said center hub portion, with said second surface directing a supply of air toward said plurality of blades.

11. The vehicle seat of claim 1, wherein said rotor is mounted directly to said impeller by at least one of a mechanical fastener, and a chemical fastener.

12. The vehicle seat of claim 1, wherein said rotor is an integral portion of said impeller.

13. The vehicle seat of claim 1, wherein said rotor comprises a plastic binder material and a magnetic material molded within said plastic binder material.

14. The vehicle seat of claim 1, wherein said plurality of permanent magnets are directly molded into said rotor.

15. The vehicle seat of claim 1, further comprising a flux plate coupled to said impeller, with said plurality of permanent magnets coupled to said flux plate.

16. The vehicle seat of claim 1, wherein said stator comprises a PCB substrate with said plurality of driving coils comprising a plurality of windings embedded within said PCB substrate.

17. The vehicle seat of claim 1, wherein said stator comprises a PCB substrate and a plurality of traces printed on said PCB substrate, with said plurality of driving coils coupled to said plurality of traces.

18. The vehicle seat of claim 1, wherein a combined height of said stator and said rotor positioned within said housing is no greater than to 10 millimeters.

19. The vehicle seat of claim 1, wherein a diameter of at least one of said stator and said rotor is between 20 and 60 millimeters.

20. The vehicle seat of claim 1, wherein said housing is further defined as at least one of a cage housing and a volute housing.

21. The vehicle seat of claim 20, wherein said volute housing comprises:
    an inlet positioned along said rotational axis for receiving a supply of air along said rotational axis;
    a cavity with said rotor and said impeller positioned within said cavity, and said cavity fluidly communicating with said inlet to receive said supply of air from said inlet; and
    an outlet having one end fluidly communicating with said cavity to receive said flow of air from said impeller, said outlet having an opposing end fluidly communicating with said passage of at least one of said seat bottom and said seat back to direct said flow of air to said passage.

22. The vehicle seat of claim 20, wherein said cage housing comprises:
    a top plate having an inlet positioned along said rotational axis for receiving a supply of air along said rotational axis;
    a bottom plate spaced from said top plate to define a plurality of outlets positioned about said rotational axis; and
    a plurality of posts connecting said top and bottom plates to one another;
    said rotor and said impeller positioned between said top and bottom plates to receive said supply of air from said inlet and direct said flow of air through said plurality of outlets to said passage.

23. A blower assembly for use with a vehicle seat, the vehicle seat comprising a seat bottom and a seat back coupled to the seat bottom, with at least one of the seat bottom cushion and the seat back having a passage, the blower assembly comprising:
    a housing;
    a stator coupled to said housing and comprising a plurality of driving coils;
    a rotor rotatably coupled to said housing about a rotational axis, said rotor comprising a plurality of permanent magnets arranged in a concentrated array to generate a flux concentrated on said plurality of driving coils; and an impeller coupled to said rotor to rotate about said rotational axis for generating a flow of air through the passage of the seat bottom and the seat back cushion of the vehicle seat;

said rotor comprising a first side and a second side with said impeller mounted to said first side and said second side facing said stator, with said plurality of permanent magnets arranged in a concentrated array to generate said flux about said second side and in an axial direction toward said plurality of driving coils.

* * * * *